United States Patent [19]
Boyajian

[11] 3,958,893
[45] May 25, 1976

[54] DRILL GUIDE

[76] Inventor: Alfred Z. Boyajian, P.O. Box 811, Manhattan Beach, Calif. 90266

[22] Filed: Sept. 10, 1974

[21] Appl. No.: 504,807

[52] U.S. Cl. .................................................. 408/112
[51] Int. Cl.² .......................................... B23B 45/14
[58] Field of Search ............... 408/91, 75, 112, 111, 408/110, 87, 115, 712, 100, 92, 72 R, 241 R

[56] References Cited

UNITED STATES PATENTS

| | | | |
|---|---|---|---|
| 2,642,761 | 6/1953 | Goldberg | 408/99 |
| 2,849,900 | 9/1958 | Heidtman, Jr. | 408/112 |
| 2,888,965 | 6/1959 | Phillips | 408/110 X |
| 2,936,657 | 5/1960 | Berlin et al. | 408/115 X |
| 2,997,900 | 8/1961 | Pugsley | 408/112 X |
| 3,708,238 | 1/1973 | Kissane | 408/112 |

*Primary Examiner*—Leonidas Vlachos
*Attorney, Agent, or Firm*—Robert T. Gammons

[57] ABSTRACT

A drill guide for supporting a power drill in a predetermined relation to intersecting bench marks on the base of the drill guide by means of which it may be accurately positioned for a drilling operation characterized in that it is provided with an adapter for receiving power drills of various kinds and size and which enables removing and replacing the power drill after an initial adjustment without readjustment in relation to the bench marks.

10 Claims, 9 Drawing Figures

DRILL GUIDE

BACKGROUND OF INVENTION

In my pending application there is shown a drill guide provided with an adapter for mounting the drill guide for movement toward and from a base on which there are intersecting bench marks. The adapter is designed to enable adjusting the axis of the drill to a predetermined position with respect to the base and there is a carriage on which the adapter is mounted which may be removed to enable removing and replacing the drill after it has once been positioned in a predetermined position without readjustment. The drill guide of this invention is similar to that disclosed in the aforesaid application but provided with improvements which make it especially designed for mounting power drills of foreign make and in particular those that have a fixed clamp band concentric with the chuck which provides convenient means for attaching the power drill to the drill guide of this invention. The guide has the added versatility that it is possible after once aligning the axis of the power drill with the intersecting bench marks of removing the carriage, coupling and power drill as a unit, or of removing the coupling and the power drill as a unit or of removing the power drill solely and in each case replacing the power drill without having to readjust the axis of the power drill with the intersectng bench marks.

SUMMARY OF INVENTION

As herein illustrated, the drill guide comprises a base, a carriage, means mounting the carriage on the base for movement toward and from the base, a coupling, interengageable means on the carriage and coupling, supporting the coupling in a predetermined angle and position relative to the base, said coupling containing a seat for receiving the power drill, spring means yieldably supporting the carriage above the base for downward movement toward the base and means releasably attaching the coupling to the carriage and the power drill to the coupling so that either the coupling or the power drill or both may be removed from the mounting means and replaced without readjustment to restore it to its predetermined relation to the base.

The invention will now be described with reference to the accompanying drawings, wherein FIG. 1 is a perspective view of the drill guide as used for drilling holes in work upon which it is positioned showing in dot and dash lines a power drill mounted with its axis aligned with the intersection of the bench marks on the base;

Figure 4:
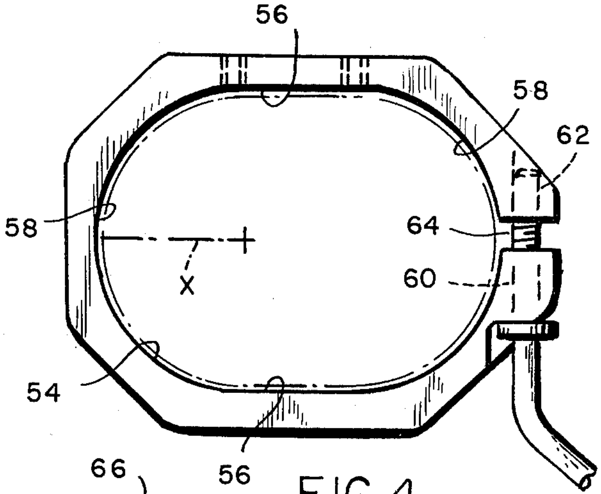
Figure 5:
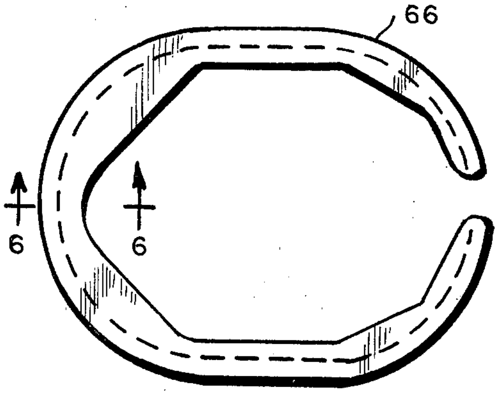
Figure 6:
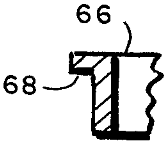
Figure 7:
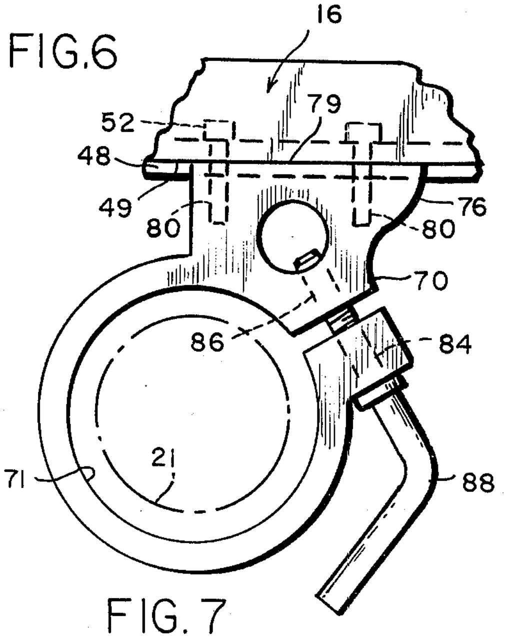
Figure 9:
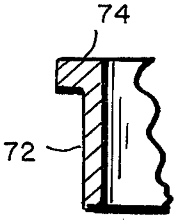
Figure 8:
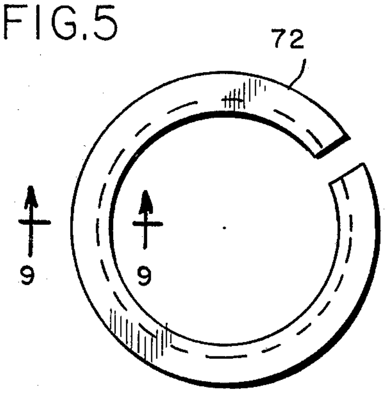

FI. 4 is a plan view of the coupling; FIG. 5 is a plan view of a size reducer for the coupling shown in FIG. 4;

FIG. 6 is a section taken on the line 6,6 of FIG. 5;

FIG. 7 is a plan view of another form of coupling;

FIG. 8 is a plan view of a size reducer for the coupling shown in FIG. 7; and FIG. 9 is a section taken on the line 9,9 of FIG. 8.

Figure 1:
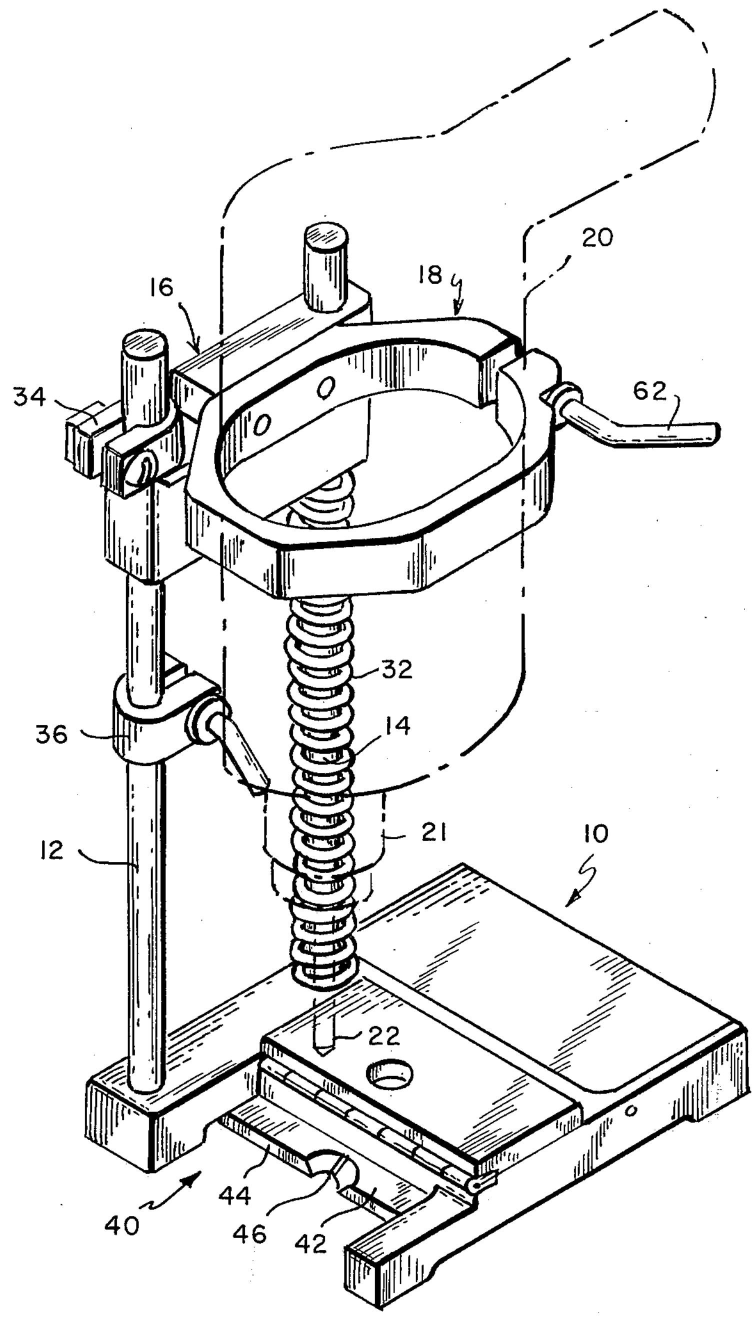
Figure 2:
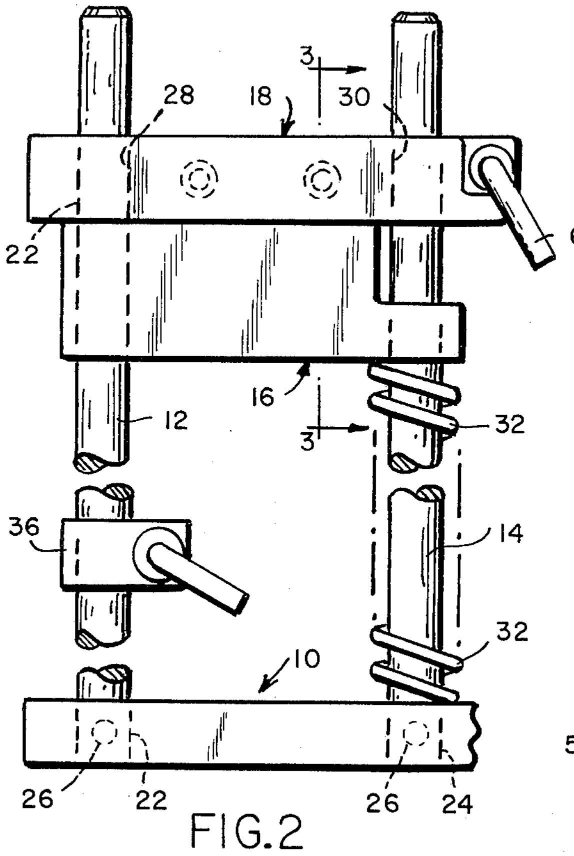
FIG. 2 is a fragmentary elevation of the drill guide.
Figure 3:
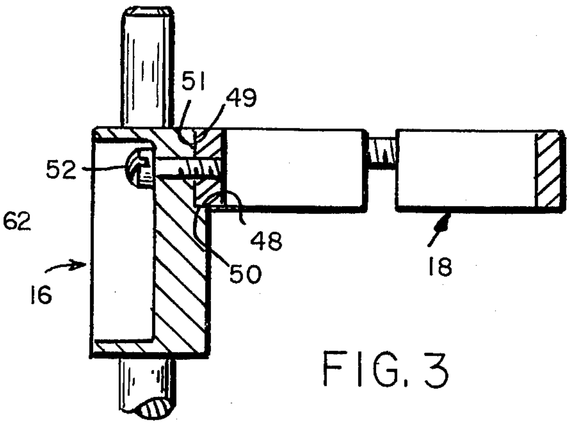
FIG. 3 is a fragmentary vertical section taken on the line 3,3 of FIG. 2.

Referring to the drawings, FIGS. 1, 2 and 3, the drill guide comprises a substantially rectangular base 10 along one side of which are mounted two posts 12 and 14, a carriage 16 mounted on the posts for movement to and from the base and a coupling 18 attached to the carriage for securing a power driven drill 20 together with a drill bit 22 mounted in the chuck of the power drill with the axis of the drill in a predetermined position of perpendicularity with respect to the base.

The posts 12 and 14 are of circular cross section and their lower ends are set into holes 22, 24 drilled into the base and secured therein, for example, by set screws 26. The posts 12 and 14 are parallel to each other and to the sides of the base and constitute a support and guide for the carriage.

The carriage 18 comprises a block having at its opposite ends spaced parallel openings 28 and 30 for slidably receiving the posts 12 and 14. A coiled spring 32 mounted on the post 14 between the carriage and the base yieldably supports the carriage at the upper ends of the posts against a stop 34 at the upper end of post 12 which limits upward movement of the carriage. A stop 36 at the lower end of the post 12 limits downward movement of the carriage.

The base 10 is like that shown in my pending application, Ser. No. 387,471, filed Aug. 10, 1973, now U.S. Pat. No. 3,838,935 and has at its forward end an opening 40 within which there is mounted a gauge plate 42 provided with an edge 44 which constitutes a gauge line or bench mark and on a line at right angles thereto a gauge line or bench mark 46. The gauge marks 44 and 46 provide means for positioning the base of the drill guide in alignment with a punch mark on the work to be drilled and the gauge plate is adjustable as disclosed in the aforesaid application to bring it into exact alignment with the axis of the power drill. The gauge plate as shown in the aforesaid application is adjustable forwardly and rearwardly, from side to side and about a vertical axis.

In accordance with this invention, the coupling 18 is fixed to the carriage 16 in engagement with an upwardly facing locating or positioning shoulder 48 which projects horizontally from the inner side of the carriage block against a flat right angularly disposed shoulder. 49. The coupling has a downwardly facing shoulder 50 along one side for engagement with the shoulder 48 and a flat right angularly disposed shoulder 49 for engagement with the shoulder 51. Screw bolts 52 mounted in holes in the carriage block above the shoulder 48 and threaded into the coupling provide for fixing it in place. The shoulders 48, 49, 50 and 51 are formed so that the coupling is precisely parallel from side to side and from front to back with respect to the base.

The coupling is designed to be clamped to the housing of a power drill without having to modify the housing or to tap threaded holes therein and in one form is designed especially to receive the fixed clamping band which is provided on most foreign made power drills. The aforesaid clamping ban is concentric with the axis of the drill and is employed to enablle driving attachments used for purposes other than drilling and are generally of one or two standard sizes. Thus, it becomes possible by using a coupling with a size reducer to accommodate most of the power drills which are in common use.

As herein illustrated the coupling in one form is a split collar containing an opening 54 of generally oval configuraton for receiving the part of the drill housing adjacent to the chuck. The opening 54 has spaced parallel relatively straight side portions 56—56 and curve end portions 58—58. The split end contains openings 60 and 62, the latter being threaded for receiving a threaded spindle 64 by means of which the split ends may be drawn together to clamp a power drill housing mounted in the opening 54 rigidly to the carriage. When clamped the axis of the drill chuck will be precisely perpendicular to the base. By adjusting the gauge plate on the base to bring the intersecting gauge lines precisely into alignment with the axis of the drill bit the drill bit may be easily aligned with a bench mark on the work to insure accurate centering of the drill bit relative to the punch mark and perpendicularity of the hole being drilled.

A split size reducer 66 as shown in FIGS. 5 and 6 may be employed in conjunction with the coupling to accommodate a power drill housing of similar shape but smaller size. The size reducer has a peripheral flange 68 so that when placed in the coupling it will seat on the upper side without sliding through.

As related above, a fixed clamp band 21 is provided on many power drills which is concentric to the chuck and this provides convenient means for attaching the drill to the carriage. For power drills of this kind a coupling 70 in the form of a split collar containing a circular opening 71 may be employed as shown in FIG. 7 together with a split size reducer 72, shown in FIGS. 8 and 9, having a circular opening. The size reducer 72 has annular shoulder 74 for supporting it in the coupling. As shown in FIG. 7, the coupling 70 is provided with an attaching bracket 76 provided with right angularly disposed edges or shoulders 78, 79 for engagement with the shoulders 48, 49 of the carriage and with threaded openings 80—80 for receiving the screw bolts 52. The split ends of the couplings contain openings 84 and 86, the latter being threaded to receive a clamp screw 88.

In each form the coupling is secured to the carriage in engagement with the shoulders 48,49 which align it with the base so that the axis of the chuck and hence of the drill bit is perpendicular to the base. When the power drill is clamped in perpendicular alignment with respect to the base and its axis is aligned with respect to the gauge lines on the gague plate the drill bit will be accurately aligned with the work for the drilling operation.

In my prior application the carriage 16 was mounted on the posts so that it could be easily removed and hence it was possible without detaching the power drill from the coupling or carriage to remove the carriage, coupling and power drill to use the drill for some other operation and then replace it on the drill guide without having to make readjustments. As constructed herein added versatility is provided in that in addition to being able to remove the carriage with the coupling and power drill as a unit, the coupling and power drill may be removed as a unit and replaced without loss of accuracy of the original adjustment and the power drill itself may be removed from the coupling without removing the latter and replaced without loss of position.

It has been found that the distance X from the top of the drill housing to the axis of the chuck is substantially the same for all power drills and so for convenience the coupling is designed so that the forward end provides positioning means for obtaining an approximation of the desired position of the power drill on the base and so that only minor adjustments of the gauge plate are required to bring the gauge lines into alignment with the axis of the drill bit.

It should be understood that the present disclosure is for the purpose of illustration only and includes all modifications or improvements which fall within the scope of the appended claims.

I claim:

1. A portable power drill guide comprising a base, a carriage, means mounting the carriage on the basis for movement toward and from the base, a coupling, interengageable means on the carriage and coupling supporting the coupling at a predetermined angle and position relative to the base, said coupling containing a seat for receiving the power drill and providing when the power drill is clamped thereon fore and aft positioning means for the axis of the chuck.

2. Apparatus according to claim 1, wherein the coupling is a split collar containing a circular opening for receiving the clamp band of a power drill, and means at the ends of the collar to draw the ends together on the clamp band of the power drill to bind the power drill to the coupling.

3. A portable drill guide comprising a base, a carriage, means mounting the carriage on the base for movement toward and from the base, a coupling, interengageable means on the carriage and coupling, supporting the coupling in a predetermined angle and position relative to the base, said coupling containing a seat for receiving a power drill, spring means yieldably supporting the carriage above the base for downward movement toward the base and means releasably attaching the coupling to the carriage and the power drill to the coupling comprising means for attaching the coupling to the carriage and means for constricting the coupling about the power drill so that either the coupling or the power drill or both may be removed from the mounting means and replaced without readjustment to restore it to said predetermined relation to the base.

4. A portable drill guide according to claim 3, wherein the interengageable means comprises an upwardly facing shoulder on the carriage and a downwardly facing shoulder on the coupling and wherein the means for releasably attaching the coupling to the carriage and the power drill to the coupling comprise means for clamping the respective shoulders into engagement and for constricting the coupling about the power drill.

5. A portable drill guide according to claim 4, wherein the carriage and coupling have uniformly flat surfaces which meet in a common plane relative to the base.

6. A portable drill guide according to claim 4, wherein the shoulders are parallel to the base.

7. A portable drill guide according to claim 3, wherein the means mounting the carriage on the base comprises vertically disposed spaced parallel posts each with its lower end fixed to the base and of circular cross section for slidingly receiving circular openings in the carriage.

8. A portable drill guide according to claim 7, wherein there is a coil spring mounted on one of the posts between the base and the underside of the carriage for yieldably supporting the carriage and vertically spaced clamp collars on the other post for limiting the vertical movement of the carriage relative to the base.

9. A portable drill guide according to claim 1, wherein there is a gauge plate adjustably mounted on the base for movement in a plane perpendicular to the axis of the power drill by means of which right angularly intersecting gauge lines on the gauge plate may be aligned with the perpendicular axis of the drill.

10. A portable drill guide according to claim 1, wherein said interengageable means on the carriage and coupling comprise right angularly disposed shoulders.

* * * * *